United States Patent
Beheydt et al.

(10) Patent No.: US 12,137,281 B2
(45) Date of Patent: Nov. 5, 2024

(54) SYSTEMS AND METHODS FOR TRANSPORTING DATA OVER CONTENT DELIVERY NETWORKS

(71) Applicant: Synamedia Vividtec Holdings, Inc., Lawrenceville, GA (US)

(72) Inventors: Samie Beheydt, Brussels (BE); Jan De Smet, Brussels (BE); Jan Nicolaas Fielibert, Brussels (BE)

(73) Assignee: SYNAMEDIA VIVIDTEC HOLDINGS, INC., Lawrenceville, GA (US)

( * ) Notice: Subject to any disclaimer, the term of this patent is extended or adjusted under 35 U.S.C. 154(b) by 0 days.

(21) Appl. No.: 17/546,624

(22) Filed: Dec. 9, 2021

(65) Prior Publication Data
US 2023/0188810 A1 Jun. 15, 2023

(51) Int. Cl.
*H04N 21/845* (2011.01)
*H04N 21/2343* (2011.01)
*H04N 21/236* (2011.01)
*H04N 21/6375* (2011.01)

(52) U.S. Cl.
CPC ... *H04N 21/845* (2013.01); *H04N 21/234345* (2013.01); *H04N 21/23605* (2013.01); *H04N 21/6375* (2013.01)

(58) Field of Classification Search
CPC ......... H04N 21/845; H04N 21/234345; H04N 23/23605; H04N 23/6375
See application file for complete search history.

(56) References Cited

U.S. PATENT DOCUMENTS

| | | | | |
|---|---|---|---|---|
| 2007/0100473 A1* | 5/2007 | Shvodian | ............... | H04L 69/28 700/19 |
| 2012/0003976 A1* | 1/2012 | Bhat | ..................... | H04W 48/18 455/436 |
| 2012/0233228 A1* | 9/2012 | Barton | .................. | G06F 3/0626 707/827 |
| 2012/0275597 A1* | 11/2012 | Knox | ................. | H04N 21/8456 380/210 |
| 2014/0082125 A1* | 3/2014 | van Coppenolle | .... | H04N 21/84 709/213 |
| 2014/0245359 A1 | 8/2014 | De Foy et al. | | |

(Continued)

OTHER PUBLICATIONS

Extended European Search Report issued by the European Patent Office in related European Application No. 22210695.7-1208, mailed Mar. 24, 2023.

*Primary Examiner* — Joshua D Taylor
(74) *Attorney, Agent, or Firm* — Finnegan, Henderson, Farabow, Garrett & Dunner, LLP

(57) ABSTRACT

A computer-implemented system is provided that includes instructions that, when executed by at least one processor, cause the at least one processor to perform operations for transporting data over content delivery networks, the operations comprising: segmenting a data stream into a plurality of segments, where a segment may include at least one packet; generating a manifest file containing information associated with one or more segments in the plurality of segments, receiving a request for the manifest file, transmitting the manifest file to a receiver through a content delivery network, receiving a request for a segment in the manifest file, and transmitting the requested segment to the receiver through the content delivery network.

21 Claims, 9 Drawing Sheets

(56) References Cited

U.S. PATENT DOCUMENTS

| | | | |
|---|---|---|---|
| 2015/0006749 A1* | 1/2015 | Hendel | H04L 47/34 |
| | | | 709/230 |
| 2015/0103846 A1* | 4/2015 | Dung Dao | H04L 47/28 |
| | | | 370/437 |
| 2017/0041372 A1* | 2/2017 | Hosur | H04L 65/762 |
| 2019/0090001 A1* | 3/2019 | Smith | H04N 21/8456 |
| 2019/0090005 A1* | 3/2019 | Kipp | H04L 47/25 |
| 2020/0120536 A1* | 4/2020 | Prakash | H04L 47/24 |
| 2020/0382409 A1* | 12/2020 | Han | H04L 43/0858 |
| 2021/0274266 A1 | 9/2021 | Lohmar et al. | |

* cited by examiner

```
600
  601  #EXTM3U
  605  #EXT-X-FORMAT:STS  603
  607  #EXT-X-VERSION:1
  609  #EXT-X-TARGETDURATION:6
       #EXT-X-MEDIA-SEQUENCE:32
  610a {#EXT-X-PROGRAM-DATE-TIME:2021-02-09T11:17:18.921Z
        #EXTINF:6.00s
        stream1_32.sts
  610b {#EXT-X-PROGRAM-DATE-TIME:2021-02-09T11:17:24.921Z
        #EXTINF:6.00s
        stream1_33.sts
  610c {#EXT-X-PROGRAM-DATE-TIME:2021-02-09T11:17:30.921Z
        #EXTINF:6.00s
        stream1_34.sts
  610d {#EXT-X-PROGRAM-DATE-TIME:2021-02-09T11:17:36.921Z
        #EXTINF:6.00s
        stream1_35.sts
  610e {#EXT-X-PROGRAM-DATE-TIME:2021-02-09T11:17:42.921Z
        #EXTINF:6.00s
        stream1_36.sts
```

FIG. 6

SYSTEMS AND METHODS FOR TRANSPORTING DATA OVER CONTENT DELIVERY NETWORKS

TECHNICAL FIELD

The present disclosure relates generally to the field of data transfer and computer-implemented systems and methods for the delivery of transport streams over electronic networks. More specifically, and without limitation, this disclosure relates to systems, methods, and computer-readable media for transporting data over one or more content delivery networks. The systems and methods disclosed herein may be used in various applications, including in transfer and delivery of media content, including broadcasts, video, audio, images, music, or any other content. As a non-limiting example, the systems and methods disclosed herein may be implemented to deliver MPEG-2 transport streams containing one or more data packets corresponding to a content to one or more client devices for consumption of the content by one or more consumers through the use of content delivery networks.

BACKGROUND

Modern media distribution networks often distribute a high amount of data during transmission of content to consumers. Low-cost methods of transferring data are therefore often advantageous to minimize the cost associated with the transfer of data from source to destination. Yet, extant media distribution networks must often incur high costs to avoid suffering a penalty in terms of reliability, security, data transparency, and/or latency. A low-cost alternative to traditional media transfer networks is the use of content delivery networks (or "CDNs"), which comprise geographically distributed servers often much closer to end users and often provide lower bandwidth cost, loading times, and other benefits. However, content delivery networks may lack the reliability that is often desired in modern media distribution networks, such as distribution networks that require an uninterrupted method of distributing high-quality content around the clock. Further, security may be a concern in content delivery networks, yet encryption may hinder the ability to transport data over such networks in a seamless manner that is independent of the transported data.

Therefore, there is a need for improvements in the transfer of data in media distribution networks through the use of content delivery networks. Among other things, there is a need for methods that allow for reliable and uninterrupted transportation of data over content delivery networks in a low-cost manner. Computer-implemented systems and methods are also needed for transporting encrypted data over such networks in a manner that is transparent and agnostic of the transported data. The needed technical solutions should also provide low latency associated with the transmission of the data. Embodiments of the present disclosure provide such improvements and can address one or more of the above-noted technical drawbacks and disadvantages of extant solutions.

SUMMARY

Embodiments of the present disclosure include systems, methods, and computer-readable media for transmitting data. Consistent with some disclosed embodiments, systems, methods, and computer-readable media are provided for transporting data over content delivery networks. These and other embodiments, features, and implementations are described herein.

Consistent with the present disclosure, a system of one or more computers can be configured to perform operations or actions by virtue of having software, firmware, hardware, or a combination of them installed for the system that in operation causes or cause the system to perform those operations or actions. One or more computer programs can be configured to perform operations or actions by virtue of including instructions that, when executed by a data processing apparatus (such as one or more processors), cause the apparatus to perform such operations or actions.

One general aspect includes a non-transitory computer readable medium including instructions that, when executed by at least one processor, cause the at least one processor to perform operations for transporting data over content delivery networks, the operations comprising: segmenting a data stream into a plurality of segments, where a segment may include at least one packet; generating a manifest file containing information associated with one or more segments in the plurality of segments, receiving a request for the manifest file, transmitting the manifest file to a receiver through a content delivery network, receiving a request for a segment in the manifest file, and transmitting the requested segment to the receiver through the content delivery network. Other embodiments of this aspect include corresponding computer systems, apparatuses, and computer programs recorded on one or more computer storage devices, each configured to perform the actions of the methods.

Implementations may include one or more of the following features. At least some of the segments in the plurality of segments may have a fixed duration or a variable duration. The operations may further include further segmenting at least some of the segments in the plurality of segments into a plurality of chunks, where a chunk in the plurality of chunks may be associated with at least one packet. The operations may further include: generating a first chunk of a new segment; appending information associated with the new segment to the manifest file; transmitting the manifest file to the receiver; and upon receipt of a request for the new segment from the receiver, transmitting the first chunk to the receiver. The operations may further include: generating a second chunk of the new segment; and transmitting the second chunk to the receiver following transmission of the first chunk. Each chunk in the plurality of chunks may have a fixed duration or a variable duration.

The operations may further include: generating a manifest file containing information associated with a first segment; upon receipt of a request for the manifest file from the receiver, transmitting the manifest file to a receiver; upon receipt of a request for the first segment from the receiver, transmitting the first segment; appending information associated with a second segment to the manifest file, thereby generating a new manifest file; upon receipt of a request for the new manifest file, transmitting the new manifest file to the receiver; and upon receipt of a request for the second segment from the receiver, transmitting the second segment. The above operations may be repeated for subsequent segments generated or processed by the non-transitory computer readable medium.

The operations may further include encrypting at least a portion of the requested segment prior to transmitting the requested segment through the content delivery network. The encrypting may include encrypting at least a portion of a payload of a packet associated with the requested segment. The operations may further include: associating a segment timestamp with the requested segment; and associating a packet time offset with a packet of the requested segment. The operations may further include calculating a release time for the packet using the segment timestamp and the packet time offset. The release time may be calculated by adding, to the segment timestamp, a latency and the packet time offset. The operations may further include discarding the packet when the release time has passed.

The operations may further include appending a format header to at least some of the segments in the plurality of segments. The operations may further include: receiving a request to re-transmit at least a portion of the requested segment when the receiver fails to receive the at least a portion of the requested segment; and re-transmitting the at least a portion of the requested segment to the receiver through the content delivery network. The request to re-transmit at least a portion of the requested segment may indicate a last packet received by the receiver, and packets subsequent to the last received packet may be re-transmitted to the receiver through the content delivery network. The requested segment may be re-transmitted to the receiver through another content delivery network. The operations may further include selecting the another content delivery network from a plurality of content delivery networks based on a predetermined criteria. The operations may further include attempting transmission of a subsequent segment using the content delivery network following re-transmission of the requested segment through the another content delivery network. Implementations of the described techniques may include hardware, a method or process, or computer software on a computer-accessible medium.

Systems and methods consistent with the present disclosure may be implemented using any suitable combination of software, firmware, and hardware. Implementations of the present disclosure may include programs or instructions that are machine constructed and/or programmed specifically for performing functions associated with the disclosed operations or actions. Still further, non-transitory computer-readable storage media may be used that store program instructions, which are executable by at least one processor to perform the steps and/or methods described herein.

It will be understood that the foregoing general description and the following detailed description are exemplary and explanatory only, and are not restrictive of the disclosed embodiments.

BRIEF DESCRIPTION OF THE DRAWINGS

The following drawings, which comprise a part of this specification, illustrate several embodiments of the present disclosure and, together with the description, serve to explain the principles and features of the disclosed embodiments.

In the drawings:

FIG. 6 illustrates an exemplary manifest file, consistent with embodiments of the present disclosure.

DETAILED DESCRIPTION

Figure 1:
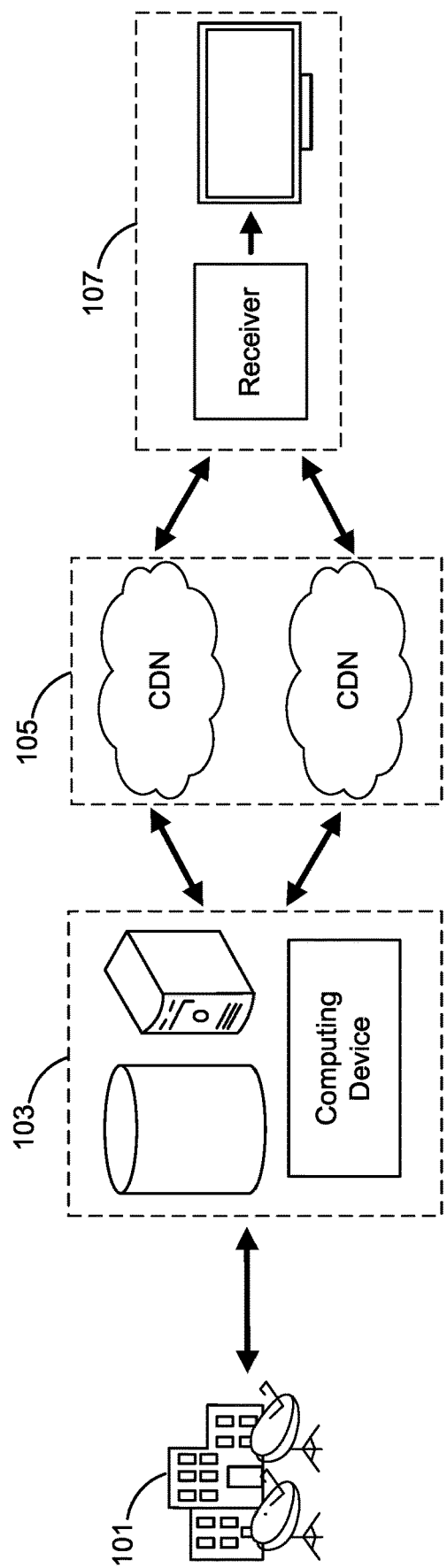
FIG. 1 is an exemplary content distribution network, consistent with embodiments of the present disclosure.

Example embodiments are described below with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, it will be appreciated that the present disclosure may be practiced without one or more of these details.

Throughout this disclosure there are references to "embodiments," which refer to examples of inventive ideas, concepts, and/or manifestations described herein. Many related and unrelated embodiments are described throughout this disclosure. The fact that some "embodiments" are described as exhibiting a feature or characteristic does not mean that other disclosed embodiments necessarily share that feature or characteristic.

Embodiments described herein include non-transitory computer readable medium containing instructions that when executed by at least one processor, cause the at least one processor to perform a method or set of operations. Non-transitory computer readable mediums may be any medium capable of storing data in any memory in a way that may be read by any computing device with a processor to carry out methods or any other instructions stored in the memory. The non-transitory computer readable medium may be implemented as software, firmware, hardware, or any combination thereof. Software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include any mechanism for storing electronic data or instructions, including Random Access Memory (RAM), a Read-Only Memory (ROM), a hard disk, an optical disk, a magnetic medium, a flash memory, other permanent, fixed, volatile or non-volatile memory. The memory may include one or more separate storage devices collocated or disbursed, capable of storing data structures, instructions, or any other data. The memory may further include a memory portion containing instructions for the processor to execute. The memory may also be used as a working memory device for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Embodiments consistent with the present disclosure may involve a network. A network may constitute any type of physical or wireless computer networking arrangement used to exchange data. For example, a network may be the Internet, a private data network, a virtual private network using a public network, a Wi-Fi network, a local area network ("LAN"), a wide area network ("WAN"), and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include one or more networks, such as a private network, a public switched telephone network ("PSTN"), the Internet, and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

FIG. 1 illustrates an example content distribution network 100, according to embodiments of the present disclosure. It is to be understood, however, that the systems and methods used to perform the steps disclosed herein may include all, some, more, or none of the subsystems shown. The exemplary content distribution network 100 of FIG. 1 includes a content producer 101, a content distribution network 103, one or more content delivery networks 105, and a client device 107.

Content producer 101 may include one or more entities that generate content to be consumed, which may be represented as videos, audio, images, or any other data. Content producer 101 may transmit content to content distribution network 103 for relay to one or more consumers. Examples of content to be transmitted include television shows, news broadcast, movies, music, radio, podcasts, video games, virtual or augmented reality content, among other types of content. Content may be presented for playback on televisions, computers, laptops, smartphones, and other electronic devices (e.g., client device 107), and which may be consumed on demand or in real-time.

Content distribution network 103 may include one or more computing systems configured to perform multimedia or data processing consistent with the present disclosure for distribution to one or more client devices (e.g., client device 107). As shown in FIG. 1, content distribution network 103 may comprise one or more servers, one or more databases, and one or more computing devices in electronical communication with one another. The computing device of content distribution network 103 is further detailed in connection with FIG. 2. In some embodiments, however, the one or more computing devices may be separate from content distribution network 103. Content distribution network 103, for example, may be configured to execute software operations that allow content distribution network 103 to communicate with a separate system or sub-system capable of performing the operations further described herein. Additionally or alternatively, content distribution network 103 may include at least one processor configured to perform one or more operations consistent with disclosed embodiments.

Content distribution network 103 may receive content or data from one or more sources (e.g., content generator 101), may process the received content or data in accordance with embodiments of the present disclosure, and may subsequently transmit the processed content or data to client devices through one or more networks (e.g., content delivery networks 105). In some embodiments, for example, content distribution network 103 may receive a transport stream from content generator 101. The server may subsequently segment the transport stream into packets or chunks to facilitate distribution of the content as further described herein. The server may also generate data associated with the segment transport stream, such as a manifest file detailing the availability, location, and information associated with the segments. Content distribution network 103 may subsequently make the segments and manifest file available to client devices through a network, such as content delivery networks 105 for distribution to a local region or one or more client devices. Other operations of content delivery network 105 are further described herein.

Content distribution network 103 may have access to one or more databases, such as the database shown in content distribution network 103, for storing multimedia, files, instructions, or any other data. The database may include one or more computing devices configured with appropriate software to perform operations consistent with the present disclosure. The database may include, for example, object storage databases for storing multimedia content, such as Amazon S3™, Microsoft Azure Blob Storage™, and Rackspace Files™, as well as relational or non-relational databases for other data storage, such as Oracle™, Sybase™, Dynamo™ DB, Hadoop™ sequence files, HBase™, or Cassandra™, and/or any other suitable databases depending on the specific application or context. The database may include components (e.g., a database management system, a database server, etc.) configured to receive and process requests for data stored in memory devices of the database(s) and to provide data from the database(s). The database may be included in, or be otherwise related to, the servers of content distribution network 103. For example, elements of the database may be embodied in one or more non-transitory media forming part of a server.

Client device 107 may include a receiver (such as receiver 309 further described below in connection with FIG. 3) for receiving data from content distribution network 103 transmitted through content delivery network 105, as well as a display, speaker, and/or other devices or components for presenting the content to a consumer. The receiver may comprise one or more computing devices (e.g., computing device 200 of FIG. 2) and/or one or more processors specially programmed to perform functions described herein. Examples of suitable devices for presenting content include a television, a smart phone, a mobile phone, a laptop, a tablet computer, a wearable computing device, a personal computer (PC), a smart television, or any other device capable of receiving and/or presenting content. In some embodiments, client device 107 may comprise multiple receivers connected to a single presentation device, or a single receiver connected to multiple presentation devices, or multiple receivers connected to multiple presentation devices, as the situation may be.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope and spirit of the disclosed embodiments.

Figure 2:
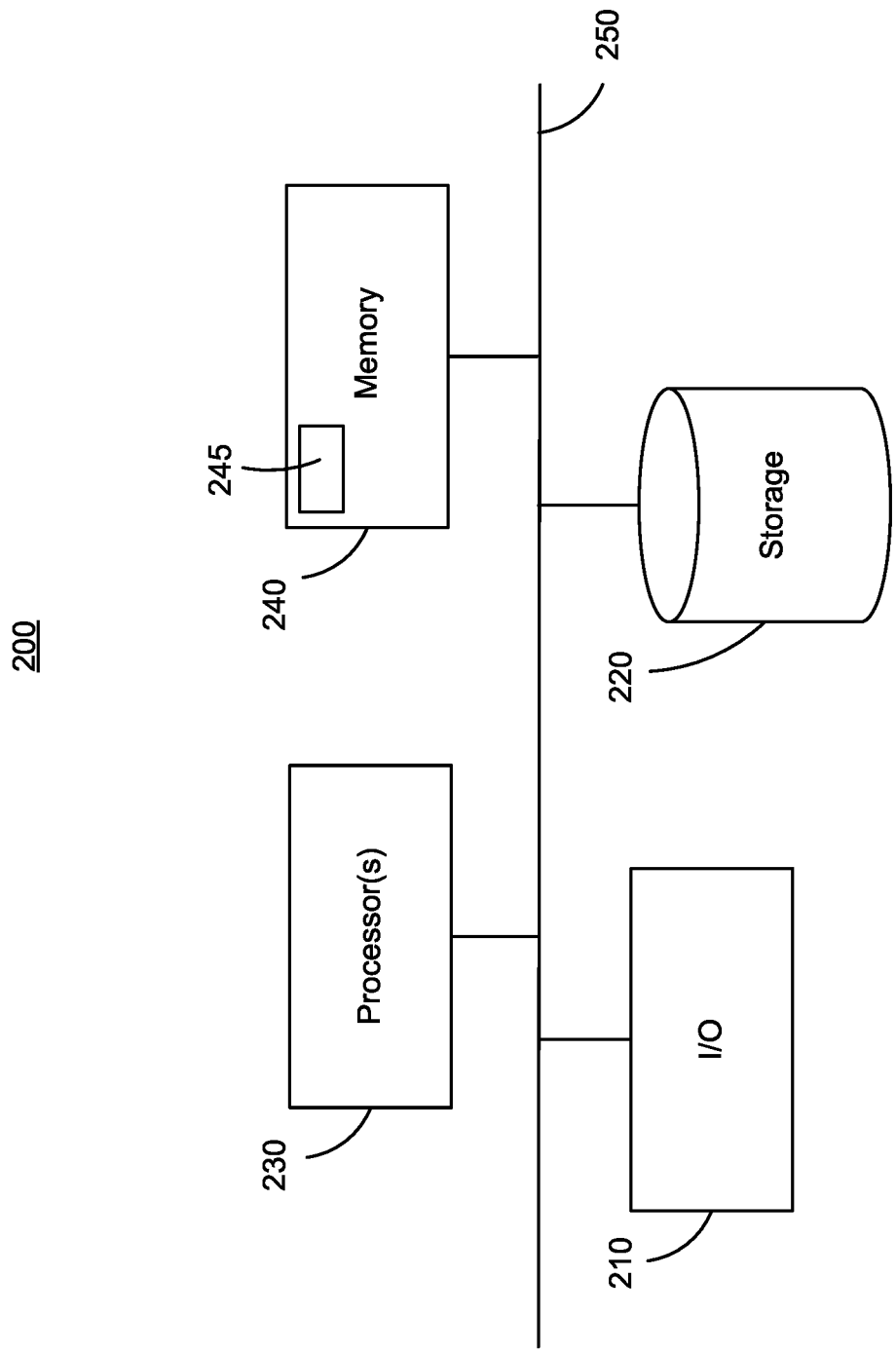
FIG. 2 illustrates an exemplary computing device which may be employed in connection with the example content distribution network of FIG. 1 and other embodiments of the present disclosure.

FIG. 2 illustrates an example computing device 200 for analyzing software applications, consistent with embodiments of the present disclosure. Computing device 200 of FIG. 2 may be the same as computing device 103 of FIG. 1, or it may be a separate component (e.g., a component inside a client device or a target service). It is to be understood that in some embodiments the computing device may include multiple sub-systems, such as cloud computing systems, servers, and/or any other suitable components for analyzing software applications.

As shown in FIG. 2, computing device 200 may include one or more processor(s) 230, which may include, for example, one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations, as noted above. In some embodiments, processor(s) 230 may include, or may be a component of, a larger processing unit implemented with one or more processors. The one or more processors 230 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

As further shown in FIG. 2, processor(s) 230 may be communicatively connected via a bus or network 250 to a memory 240. Bus or network 250 may be adapted to communicate data and other forms of information. Memory 240 may include a memory portion 245 that contains instructions that when executed by the processor(s) 230, perform the operations and methods described in more detail herein. Memory 240 may also be used as a working memory for processor(s) 230, a temporary storage, and other memory or storage roles, as the case may be. By way example, memory 240 may be a volatile memory such as, but not limited to, random access memory (RAM), or non-volatile memory (NVM), such as, but not limited to, flash memory.

Processor(s) 230 may also be communicatively connected via bus or network 250 to one or more I/O device 210. I/O device 210 may include any type of input and/or output device or periphery device. I/O device 210 may include one or more network interface cards, APIs, data ports, and/or other components for supporting connectivity with processor(s) 230 via network 250.

As further shown in FIG. 2, processor(s) 230 and the other components (210, 240) of computing device 200 may be communicatively connected to a database or storage device 220. Storage device 220 may electronically store data in an organized format, structure, or set of files. Storage device 220 may include a database management system to facilitate data storage and retrieval. While illustrated in FIG. 2 as a single device, it is to be understood that storage device 220 may include multiple devices either collocated or distributed. In some embodiments, storage device 220 may be implemented on a remote network, such as a cloud storage. Processor(s) 230 and/or memory 240 may also include machine-readable media for storing software or sets of instructions. The instructions, when executed by one or more processors 230, may cause the processor(s) to perform the various operations and functions described in further detail herein.

Implementations of computing device 200 are not limited to the example embodiment shown in FIG. 2. The number and arrangement of components (210, 220, 230, 240) may be modified and rearranged. Further, while not shown in FIG. 2, computing device 200 may be in electronic communication with other network(s), including the Internet, a local area network, a wide area network, a metro area network, and other networks capable of enabling communication between the elements of the computing architecture. Also, computing device 200 may retrieve data or other information described herein from any source, including storage device 220 as well as from network(s) or other database(s).

Figure 3:
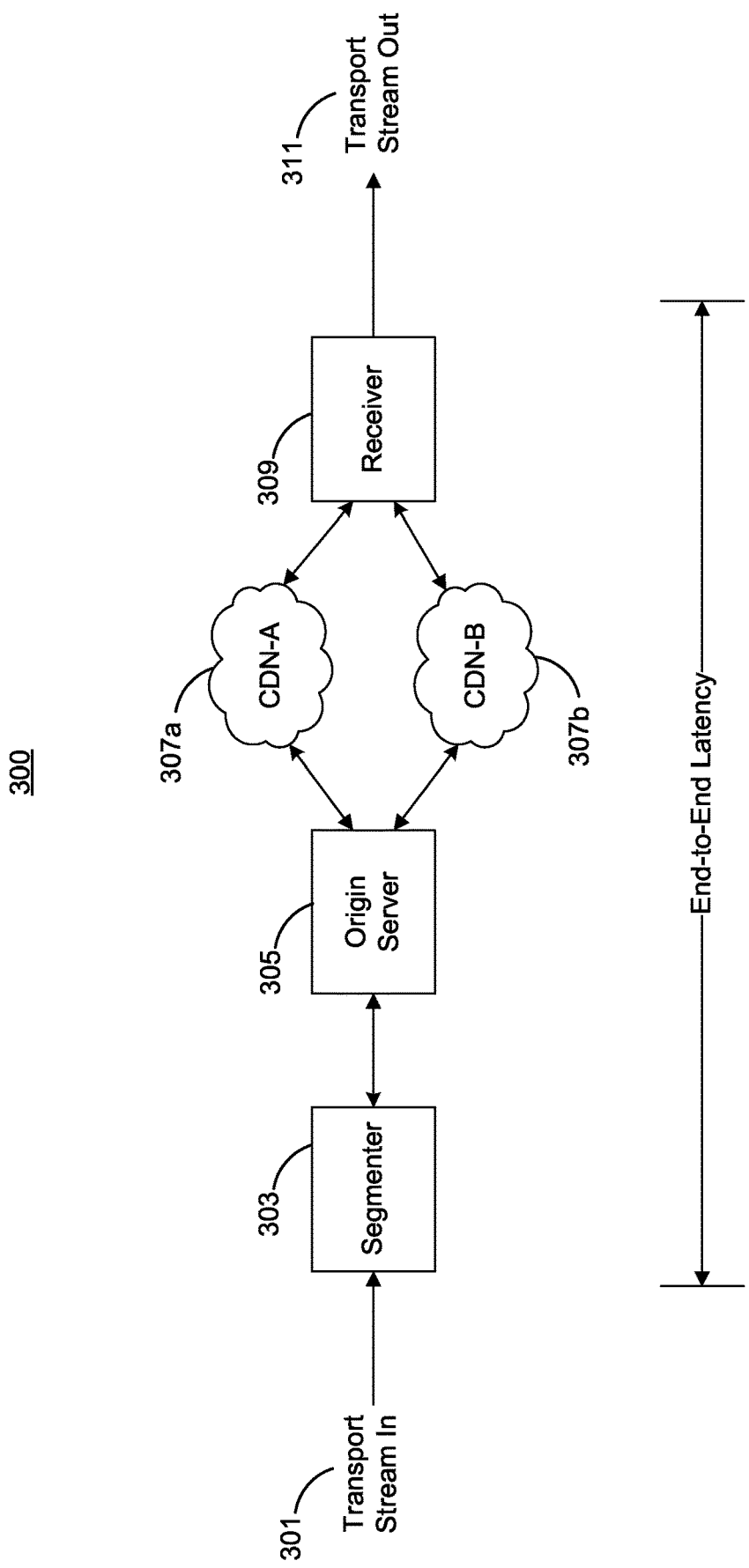
FIG. 3 illustrates an exemplary system for transporting data over a content delivery network, consistent with embodiments of the present disclosure.

FIG. 3 illustrates an exemplary system for transporting data over a content delivery network, consistent with embodiments of the present disclosure. As shown in FIG. 3, system 300 may comprise a segmenter 303, an origin server 305, one or more content delivery networks 307a and 307b, and a receiver 309. It is to be understood, however, that the system shown in FIG. 3 is for illustrative purposes only and is not intended to be limiting.

As further shown in FIG. 3, system 300 may receive as input a transport stream 301. A transport stream, as used herein, may refer to any digital container for transmission of multimedia or a part thereof, such as video, audio, images, or any other content. For example, transport stream 301 may contain video, audio, and other data in a multiplexed data stream. Transport stream 301 may further contain metadata detailing the multiple data streams in the transport stream. In some embodiments, transport stream 301 may encapsulate multiple data streams into a single data stream or flow. Examples of transport stream formats include the Moving Picture Experts Group (MPEG) format, the MPEG-2 format, the MPEG-4 Part 14 (MP4) format, the 3rd Generation Partnership Project (3GP) format, the Audio Video Interleaved (AVI) format, the Interchange File Format (IFF), the QuickTime format, and the Flash Video format, among others.

System 300 may receive transport stream 301 via segmenter 303, which may segment the transport stream 301 into a plurality of segments. A segment may comprise one or more data packets, where each data packet may comprise control information (e.g., headers and metadata) and data to be shared also known as a "payload." A segment may have a fixed duration or a variable duration. In some embodiments, segmenter 303 may further divide a segment into smaller units, herein referred to as a "chunk." Thus, in such embodiments, a segment may comprise one or more chunks, and a chunk may be associated with one or more data packets (or portions thereof). A chunk may have a fixed duration or a variable duration. In some embodiments, however, a segment may comprise other configurations. For example, a segment may comprise a single data packet, a single chunk, or no chunks at all. Following segmentation, segmenter 303 may upload the segments to origin server 305 using any suitable method, such as using Chunked Transfer Encoding (CTE) or any other desired form of transfer.

Figure 4:
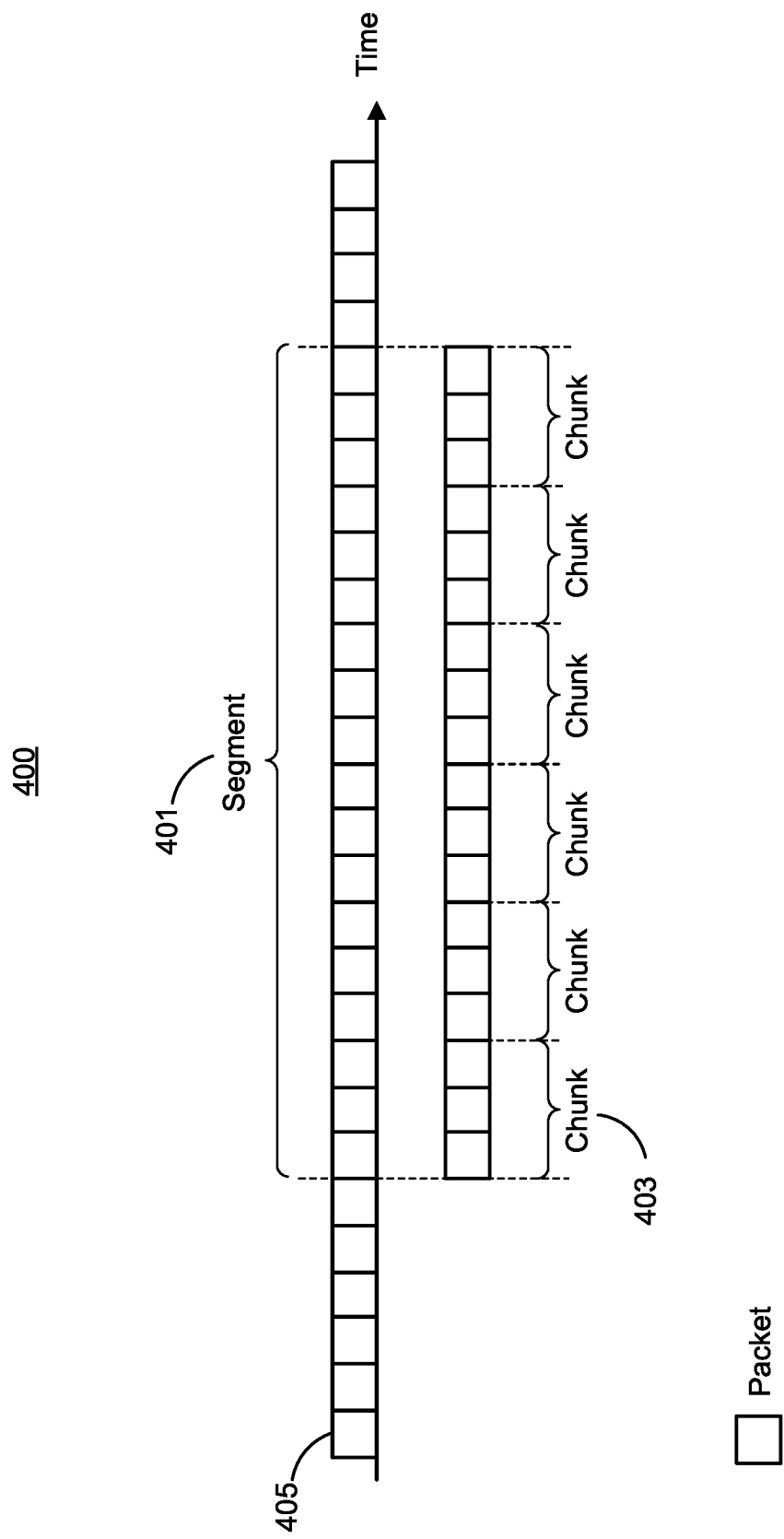
FIG. 4 illustrates an exemplary segment, consistent with embodiments of the present disclosure.

FIG. 4 illustrates an exemplary data stream 400, consistent with some embodiments of the present disclosure. As shown in FIG. 4, data stream 400 may comprise a segment 401, which may further comprise a plurality of chunks, such as chunk 403, where each chunk may be associated with a plurality of packets, such as packet 405. Data and/or metadata may be contained within segment 401, chunk 403, and/or packet 405, as previously discussed (e.g., as payload in a packet). It should be noted that, although six chunks are depicted in FIG. 4 as being part of segment 401, a segment may comprise any number of chunks (e.g., a single chunk, a few chunks, one hundred chunks, etc.). Further, although each chunk in FIG. 4 is depicted as comprising three packets, a chunk may comprise any number of packets (e.g., a single packet, a few packets, one hundred packets, etc.). Moreover, as noted previously, although segment 401 is shown as comprising multiple chunks and packets, in some embodiments a segment may have other configurations. It may, for example, comprise a single packet, a single chunk, or no chunks at all, among other configurations.

In some embodiments, at least a portion of segment 401, chunk 403, and/or packet 405 may be encrypted. For example, segment 401 may be encrypted in its entirety; or chunk 403 may be encrypted in its entirety while another portion of segment 401 is unencrypted; or packet 405 may be encrypted in its entirety while another portion of chunk 403 and/or segment 401 may be unencrypted. As another example, the payload of packet 405 may be encrypted, while other data (e.g., header or metadata information) may remain unencrypted. As yet another example, some packets may be encrypted while other packets may not.

Encryption of segment 401, chunk 403, and/or packet 405 may occur at any suitable time. For example, encryption may take place prior to segmentation, such as where the input transport stream 301 is encrypted prior to receipt by segmenter 303 of FIG. 3. Conversely, encryption may take place after segmentation, such as prior to transmission to origin server 305. Similarly, encryption may take place prior to transmission through a network, such as content delivery networks 307a or 307b, or before transmission to receiver 309. Further, the disclosed embodiments are not limited to any particular type of encryption, and any suitable encryption method or standard may be used, such as Advanced Encryption Standard (AES) encryption, Digital Video Broadcasting Conditional Access (DVB-CA) encryption, Rivest-Shamir-Adleman (RSA) encryption, Triple Data Encryption Standard (DES) encryption, symmetric encryption, asymmetric encryption, and any other form of encryption. Encryption or decryption keys may be pre-shared between parts of system 300, or they may be provided dynamically through transmissions between parts of system 300 (e.g., transmitted with manifest files), by using a Digital Rights Management service or platform, through an Out-of-Band Management service or platform, or through any other suitable method.

A segment may be formatted to include any desired information related to one or more packets and any additional information, such as formatting information, timestamp information, payload information, duration information, length information, destination information, and any other desired information.

Figure 5:
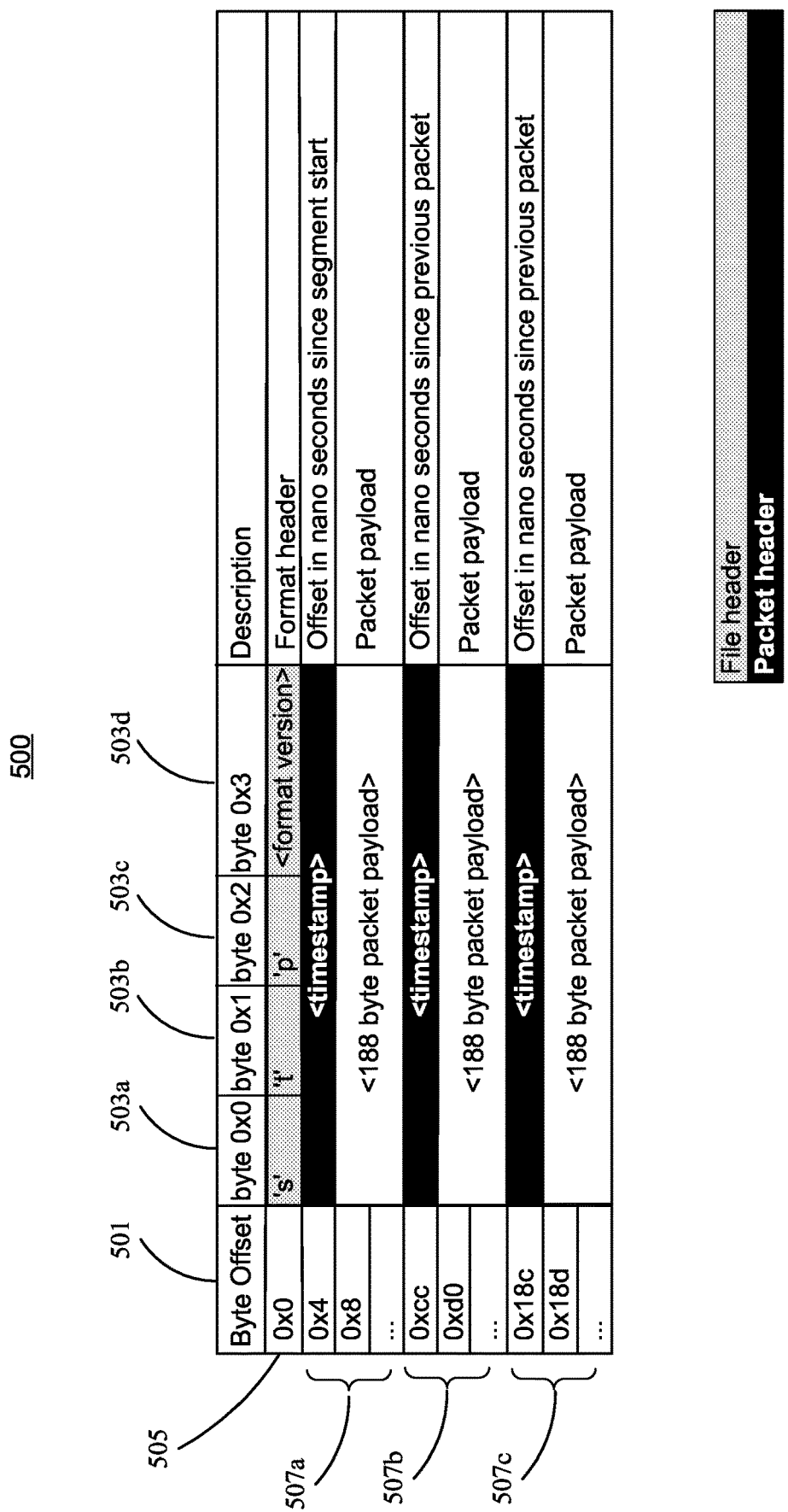
FIG. 5 illustrates an exemplary segment format, consistent with embodiments of the present disclosure.

For example, FIG. 5 illustrates an exemplary segment format 500, which may represent the format of a segment generated by segmenter 303 of FIG. 3, consistent with some embodiments of the present disclosure. As shown in FIG. 5, a segment may comprise one or more bytes of data, each byte represented as a byte offset in column 501 and a byte number in columns 503a, 503b, 503c, and 503d. A byte offset may represent a starting position from which a position of a byte is to be defined. For example, as shown in FIG. 5, format header 505 may be the first four bytes in a segment, and may thus have a byte offset of 0x0 and may comprise four bytes from that offset (i.e., bytes 0x0, 0x1, 0x2, and 0x3). Next, a first packet in a segment, such as packet 507a, may comprise a timestamp and a payload. As shown in FIG. 5, the timestamp of first packet 507a may comprise four bytes following format header 505, and may thus have a byte offset of 0x4 and may comprise four bytes from that offset (i.e., bytes 0x4, 0x5, 0x6, and 0x7). The payload of first packet 507a may comprise one or more of bytes following the timestamp, which in the exemplary embodiment of FIG. 5 is 188 bytes. The payload of first packet 507a may thus have a byte offset 0x8 and may comprise 188 bytes from that offset (i.e., byte 0x8 through 0xcb). The same convention may apply to subsequent packets, such as second packet 507b, third packet 507c, and so forth. Other arrangements and configurations for a segment than that shown in FIG. 5 are possible, however, as would be appreciated by those having ordinary skill in the art upon reviewing the present disclosure.

Format header 505 may represent the format of a segment. In the exemplary embodiment of FIG. 5, for example, format header 505 may comprise three characters, "s," "t," and "p," which indicates the proprietary format of Synamedia Vividtec Holdings, Inc., although persons having ordinary skill in the art practicing the present disclosure may arrive at their own formats and may arrive at other formatting names and conventions. Format header 505 may also comprise a "format version," which may represent different variations of the format represented by format header 505.

As further shown in FIG. 5, a packet may comprise payload and a timestamp. The timestamps of packets 507*a*, 507*b*, and 507*c* may represent timing information associated with a packet. In the exemplary embodiment of FIG. 5, for example, each timestamp represents a packet offset time from a previous packet (or for first packet 507*a*, the start of the segment). Timing information may be defined in other ways, however. For example, packet timestamps may be defined as an offset from the start of the segment, from a predefined point in time, from other data in the segment (e.g., one or more packets), or a combination thereof. Further, the timestamp may represent any desired information. For example, the timestamp may represent a release time for a packet. A release time, as used herein, may refer to an intended time of processing or utilizing the data in a packet. For example, in embodiments where a packet contains data of content to be consumed (e.g., a television show, a movie, music, etc.), the release time may represent the time at which the content associated with the packet is to be presented to a consumer (e.g., by displaying the content on a television). As can be appreciated, the specific use of a release time may depend on the specific application or context.

Although shown in FIG. 5 as comprising format header information, timestamp information, and payload information, it is to be understood that a segment may include any other desired type of information, such as duration information, length information, destination information, and any other desired information, as noted above.

Returning to FIG. 3, segmenter 303 may generate a manifest file containing information associated with one or more segments, which it may transmit to a server (e.g., origin server 305). A manifest file may contain any desired information that may aid in the transmission, processing, or use of segments, such as identifiers, availability, location, timing, length, duration, bitrate, resolution, bandwidth, language, subtitles, metadata, and any other information associated with a segment. As non-limiting examples, the manifest file may comprise segment identifiers to differentiate one segment from another, segment durations representing the presentation length of a segment, timing information indicating when a segment is to be presented to a consumer, availability information indicating when or where a segment is available to be retrieved, bitrate information for the presentation of the segment, and any other types of information as the situation may be.

For example, FIG. 6 illustrates an exemplary manifest file 600, consistent with some embodiments of the present disclosure. As shown in FIG. 6, manifest file 600 may comprise a file format tag 601, a segment format tag 603, a version tag 605, a target duration tag 607, a media sequence tag 609, and segment information 610*a*, 610*b*, 610*c*, 610*d*, and 610*e*. File format tag 601 may denote the format of the manifest file itself, generally included at the start of the manifest file, which in the exemplary embodiment of FIG. 6 is Extended M3U (EXTM3U). Any other suitable format may be used for a manifest file, however, as would be appreciated by those having ordinary skill in the art. Segment format tag 603 may denote the format of the segments associated with manifest file 600, which in this exemplary embodiment is an "STS" format, although any other identifier may be used to denote a segment format defined in accordance with the embodiments of the present disclosure. Version tag 605 may denote a version of manifest file 600, which in this exemplary illustration is version "1." Target duration tag 607 may represent the intended duration of segments associated with manifest file 600, which in FIG. 6 is exemplified as "6" seconds, although any other duration (e.g., more or less time) or method of identifying a duration (e.g., milliseconds or nanoseconds instead of seconds) may be used. Media sequence tag 609 may indicate the media sequence number of the first segment in manifest file 600, which may be represented as an integer such as the integer "32" shown in FIG. 6. Segment information 610*a*, 610*b*, 610*c*, 610*d*, and 610*e* may denote information associated with the segments associated with manifest file 600, and which may include any desired information to aid in the processing, transmission, or use of the segments. As shown in FIG. 6, for example, segment information may include: (1) timing information (e.g., "EXT-X-PROGRAM-DATE-TIME") which may be used as a reference during transmission, processing, or use of the segment (e.g., to determine when or whether to present content in a segment to a consumer); (2) duration information (e.g., "EXTINF") which may represent the duration of a specific segment; and (3) a segment identifier (e.g., "stream1_32.sts") that may be used to request, retrieve, or transmit a segment (e.g., to a client device). It is to be understood that a manifest file may include all, some, more, or none of the elements depicted in FIG. 6, as the information shown therein is provided for illustration purposes only. For example, other information may be included in a manifest file, such as segment location information, title information, bitrate information, bandwidth information, resolution information, language information, subtitle information, advertisement-related information, metadata, or any other desired information.

Returning to FIG. 3, origin server 305 may manage the storage and transmission of segments and/or manifest files generated by segmenter 303. In some embodiments, however, origin server 305 may generate segments and/or manifest files, or it may receive them from a location other than from segmenter 303 (e.g., from local memory, a database, or another server).

Origin server 305 may receive uploads of segments, manifest files, or any other data. For example, when a new segment is available from segmenter 303, segmenter 303 may issue an HTTP PUT or POST request via Chunked Transfer Encoding (CTE) to upload the segment to origin server 305. Segmenter 303 may issue an HTTP PUT or POST request to upload a first chunk of a segment to origin server 305, and it may add subsequent chunks to the segment until a last chunk of the segment is added. In some embodiments, however, origin server 305 may append chunks or packets belonging to the same segment into a single segment, such as when it receives chunks or packets belonging to the same segment from multiple sources. Origin server 305 may store the uploaded segment in a database or other storage. Origin server 305 may also receive requests for data stored in or available to origin server 305, and origin server 305 may transmit the requested data. As non-limiting examples, receiver 309 may issue requests to origin server 305 requesting a segment, chunk, packet, manifest file, or any other data. Upon receipt of the request, origin server 305 may transmit the requested data. For example, receiver 309 may issue an HTTP GET request to origin server 305 requesting a segment, and origin server 305 may transmit the segment via Chunked Transfer Encoding to the receiver, such that when a new chunk is uploaded to origin server 305 by segmenter 303, origin server 305 may forward that chunk to receiver 309. Other ways of transferring data to and from origin server 305 are possible, however, and the examples above are not intended to be exhaustive.

Further, origin server 305 may perform functions other than storage and transmission of data. For example, origin server 305 may perform authentication of requests and/or requesters to ensure information is transmitted only to trusted entities. As another example, origin server 305 may encrypt segments, manifest files, and/or any other information, such as prior to transmission to receiver 309 prior to transmission through content delivery networks 307*a* and 307*b*. As previously noted, any suitable encryption method may be employed to encrypt data, and all or only a portion of the data may be encrypted (e.g., an entire segment, only the payload of a packet, an entire manifest file, a portion of a manifest file, etc.).

One or more content delivery networks, such as content delivery networks 307*a* and 307*b*, may be used to transmit data between origin server 305 and receiver 309. In some embodiments, a specific content delivery network to be used during transmission of data may be selected using a predefined criteria. For example, each content delivery network may have one or more attributes associated with its performance, such as cost, speed, stability, geographical distance, or any other characteristic. In such cases, receiver 309 may prioritize one or more attributes of the content delivery networks in order to select one content delivery network as a preferred pathway for transmission. For example, receiver 309 may be designed to select the most cost-efficient content delivery network to request data from origin server 305, although any other attribute or combination of attributes may be used to make this determination. Furthermore, receiver 309 may switch between different content delivery networks, such as if there is a failure in transmission using a preferred content delivery network or for any other reason. For example, if at least a portion of a segment fails to be transmitted to receiver 309, receiver 309 may switch to another content delivery network to attempt re-transmission of the portion of the segment that failed to be transmitted to receiver 309. The another content delivery network may likewise be selected using a predefined criteria (e.g., based on cost, speed, stability, geographical distance, etc.). Although only two content delivery networks are depicted in FIG. 3, it is to be understood that system 300 may comprise any number of content delivery networks (e.g., a single content delivery network, a few content delivery networks, a few hundred content delivery networks, etc.).

Receiver 309 may request, receive, and transmit data to and from origin server 305 through content delivery networks 307*a* and 307*b*. In some embodiments, however, receiver 309 may be able to communicate with origin server 305 through pathways other than content delivery networks. As shown in FIG. 3, receiver 309 may generate an output transport stream 311. For example, receiver 309 may receive one or more segments from origin server 305, and it may subsequently reassemble the segments into output transport stream 311. For this purpose, receiver 309 may utilize information contained in the received segments (e.g., format or metadata information), a manifest file (e.g., a manifest file received from origin server 305), predefined rules or processes for reassembling the segments, and/or any information received by or available to receiver 309. In embodiments where segments comprise content to be consumed, receiver 309 may send output transport stream 311 to a playback device (e.g., a television, a computer, a laptop, a smartphone, a speaker, etc.) for consumption by a consumer, although receiver 309 may output information to any other device or entity. Although shown in FIG. 3 as transmitting output stream 311, it is to be understood that receiver 309 may generate and/or transmit any other type of information.

As non-limiting examples, receiver 309 may relay manifest files, segments, chunks, packets, and/or any other data received from origin server 305 (or from any other source) to another device or entity, such as another receiver, another server, another network, and/or another content delivery network.

Receiver 309 may perform functions other than requesting, receiving, and transmitting data. In some embodiments, for example, receiver 309 may compute a release time for a segment or a portion thereof (e.g., a packet), which may be used to discard data that arrives to receiver 309 too late. An exemplary process is as follows. Upon startup, receiver 309 may be configured to request a manifest file from a location associated with the manifest file. For example, receiver 309 may issue an HTTP GET request to a Uniform Resource Locator (URL), such as a URL associated with manifest files from content delivery network 307*a* (e.g., "https://cdn-a/channel-5/manifest.stsp"), content delivery network 307*b* (e.g., "https://cdn-b/channel-5/manifest.stsp"), or any other source. Upon receipt of the manifest file, receiver 309 may identify a first segment in the manifest file, and it may be configured to request the segment from a location associated with the segment. For example, receiver 309 may issue an HTTP GET request to a URL associated with segments from content delivery network 307*a* (e.g., "https://cdn-a/channel-5/segment-1234.sts"), content delivery network 307*b* (e.g., "https://cdn-b/channel-5/segment-1234.sts"), or any other source. Next, receiver 309 may be configured to determine a segment timestamp associated with the segment. For example, in some embodiments, the manifest file may contain timestamps associated with each segment included therein (e.g., as shown in segment information 610*a*, 610*b*, 610*c*, 610*d*, and 610*e* of FIG. 6), and receiver 609 may extract the segment timestamp from the manifest file. Next, following receipt of the segment, receiver 309 may extract packets from the received segment, and it may determine a packet time offset associated with the first packet of the segment. For example, in some embodiments, each packet may contain a timestamp associated with the packet (e.g., as shown in packets 507*a*, 507*b*, and 507*c* of FIG. 5), and receiver 309 may extract the packet time offset from each packet. Receiver 309 may further be configured to store and/or determine an end-to-end latency, which as shown in FIG. 3 may correspond to a delay between the receipt of input transport stream 301 and generation of output transport stream 311, although in some embodiments the boundaries of the end-to-end latency may vary depending on the specific configuration or application. Using the segment timestamp, packet time offset, and end-to-end latency, receiver 309 may determine an intended release time for each packet. An exemplary formula is as follows:

Release time=Segment timestamp+Packet time offset+Latency

For example, for a segment timestamp of 2021-10-19T14:16:21.123, a packet time offset of 2.456 seconds, and an end-to-end latency of 2.000 seconds, the release time of the packet may be equal to 2021-10-19T14:16:25.579. Using the determined release time of the packet, receiver 309 may determine whether to keep or discard the packet. For example, receiver 309 may compare the computed release time of the packet with a reference time of receiver 309; and if the release time has passed, receiver 309 may discard or otherwise ignore the packet.

After determining the release time of the first packet of the first segment, receiver 309 may utilize that release time as a reference point to determine release times for subsequent packets or segments, or it may compute a new release time for each new packet or segment, or a combination thereof, as the situation may be. Other formulas and methods for computing a release time may be utilized, however, as would be appreciated by those having ordinary skill in the art.

In some embodiments, receiver 309 may be configured to determine whether it has failed to receive any data from origin server 305 or any other source, such as a manifest file, a segment, a chunk, a packet, or any other data. In such cases, receiver 309 may be configured to issue a request to re-transmit the data that it failed to receive. For example, if receiver 309 fails to receive a manifest file after issuing a first HTTP GET request for the manifest file, it may issue a second HTTP GET request for the manifest file. As discussed previously, receiver 309 may be configured to re-request the manifest file through the same or another content delivery network in such circumstances. A similar process may follow if receiver 309 fails to receive a segment, chunk, packet, or any other data (e.g., receiver 309 may issue a second HTTP GET request for a segment).

As a further example, receiver 309 may be configured to determine a last portion of the data it received, and it may issue a request for the data at or near the last received portion. An exemplary process is as follows. Receiver 309 may initiate a download for a segment (e.g., through an HTTP GET request). During the download process, receiver 309 may determine that it has failed to receive a portion of the segment, which may be as a result of missing data, out-of-sequence timestamps, corrupted data, loss of connection with a content delivery network or any other network, delays during the download, or any other event associated with the download process. Consequently, receiver 309 may terminate the download of the segment. Receiver 309 may determine a last byte of the segment received. Receiver 309 may then issue a new HTTP GET request for the segment, but this time limited to byte range starting at or near the last received byte. For example, receiver 309 may include a Range HTTP request header, specifying the bytes of the segment not received, such as "Range: bytes=x-9007199254740991" where "x" represents the last received byte and "9007199254740991" represents an open-ended range request. Upon receipt of the new HTTP GET request with the Range HTTP request header, origin server 305 may re-transmit the requested bytes of the segment. As noted previously, receiver 309 may use the same or a different content delivery network for the re-transmission. It is to be understood that the above process is exemplary only, and other ways of determining and requesting portions of data not received by receiver 309 may be used.

In some embodiments, receiver 309 may implement a combination of methods of requesting a re-transmission of data it failed to receive. For example, receiver 309 may dynamically determine whether to request an entire re-transmission of data it failed to receive, or whether to request re-transmission of only portions of the data, depending on one or more predetermined criteria. Criteria may include the amount of data received, cost, speed, level of importance, network stability, and network reliability, among other considerations. For example, receiver 309 may maintain a buffer of packets for a segment currently being downloaded, and if a level of the buffer becomes too low, receiver 309 may retry downloading the segment. As another example, if receiver 309 already downloaded part of the segment in an initial download, receiver 309 may request re-transmission of only a portion of the segment (e.g., using a range request). As yet another example, if receiver 309 has not received any packets or other data associated with the segment, receiver 309 may request re-transmission of the entire segment. Other criteria, including combinations of criteria, may be used however, as would be appreciated by those having ordinary skill in the art.

Figure 7:
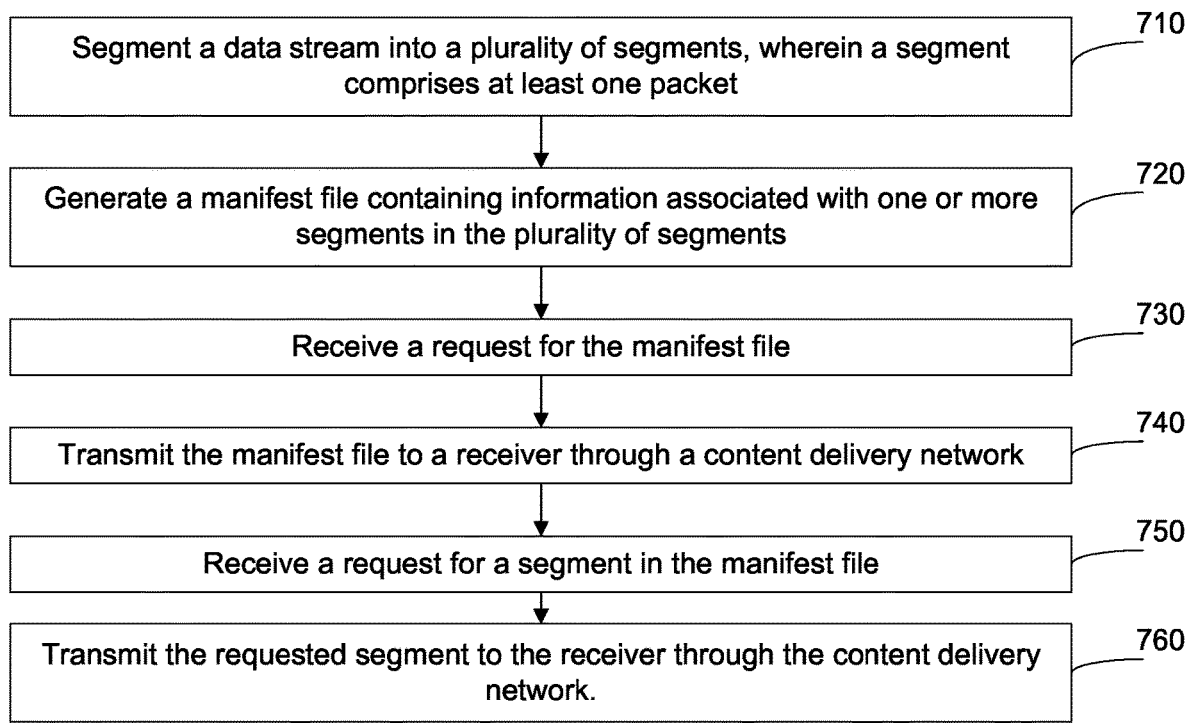
FIG. 7 illustrates an exemplary method for transmitting data over content delivery networks, consistent with embodiments of the present disclosure.

FIG. 7 illustrates an exemplary method 700 for transmitting data over content delivery networks, consistent with embodiments of the present disclosure. The example method 700 may be implemented with at least one processor (e.g., the at least one processor of the computing device in FIG. 1 or processor(s) 230 in FIG. 2). It will be appreciated that method 700 is a non-limiting example. As shown in FIG. 7, at step 710 the at least one processor may segment a data stream into a plurality of segments, wherein a segment may comprise at least one packet. At step 720, the at least one processor may generate a manifest file containing information associated with one or more segments in the plurality of segments. At step 730, the at least one processor may receive a request for the manifest file. At step 740, the at least one processor may transmit the manifest file to a receiver through a content delivery network. At step 750, the at least one processor may receive a request for a segment in the manifest file. At step 760, the at least one processor may transmit the requested segment to the receiver through the content delivery network.

Figure 8:
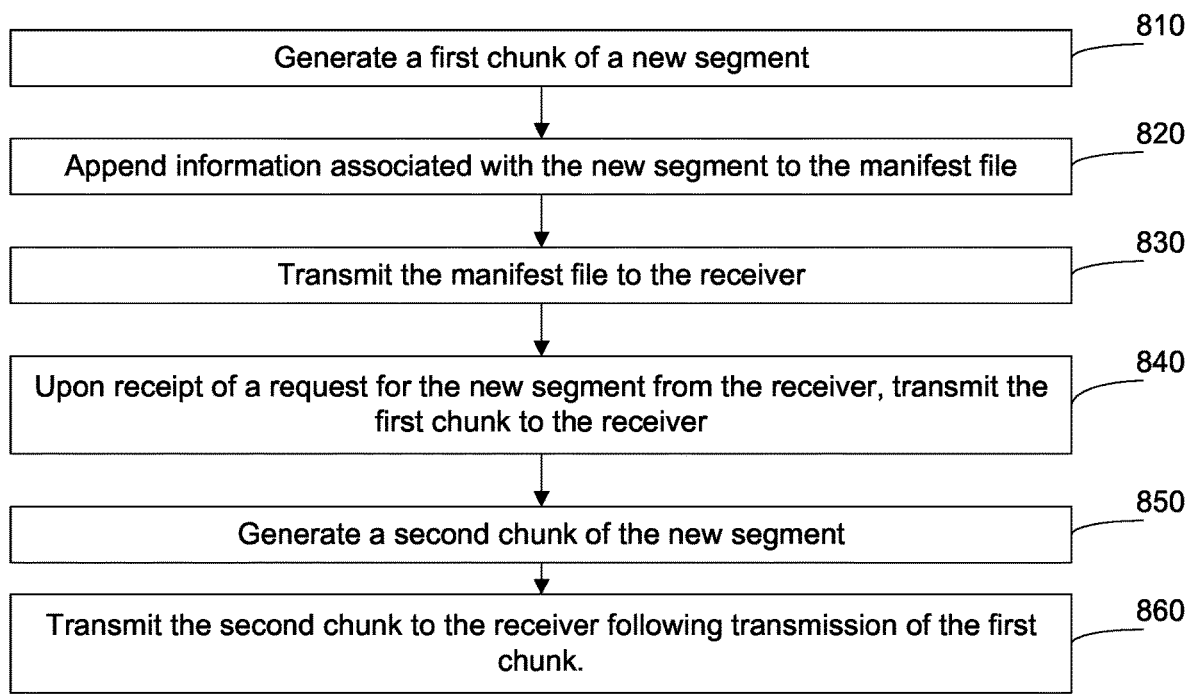
FIG. 8 illustrates an exemplary method for transmitting chunks of a segment, consistent with embodiments of the present disclosure.

FIG. 8 illustrates an exemplary method 800 for transmitting chunks of a segment, consistent with embodiments of the present disclosure. The example method 800 may be implemented with at least one processor (e.g., the at least one processor of the computing device in FIG. 1 or processor(s) 230 in FIG. 2). It will be appreciated that method 800 is a non-limiting example. As shown in FIG. 8, at step 810 the at least one processor may generate a first chunk of a new segment. At step 820, the at least one processor may append information associated with the new segment to the manifest file. At step 830, the at least one processor may transmit the manifest file to the receiver. At step 840, the at least one processor may upon receipt of a request for the new segment from the receiver, transmit the first chunk to the receiver. At step 850, the at least one processor may generate a second chunk of the new segment. At step 860, the at least one processor may transmit the second chunk to the receiver following transmission of the first chunk. In this manner, the at least one processor may transmit chunks associated with the same segment as soon as they are available, without requiring a new request for each chunk. The same process as above may be performed with other portions of a segment to achieve the same or similar result. For example, instead of using chunks, the exemplary method 800 may be performed using packets instead.

Figure 9:
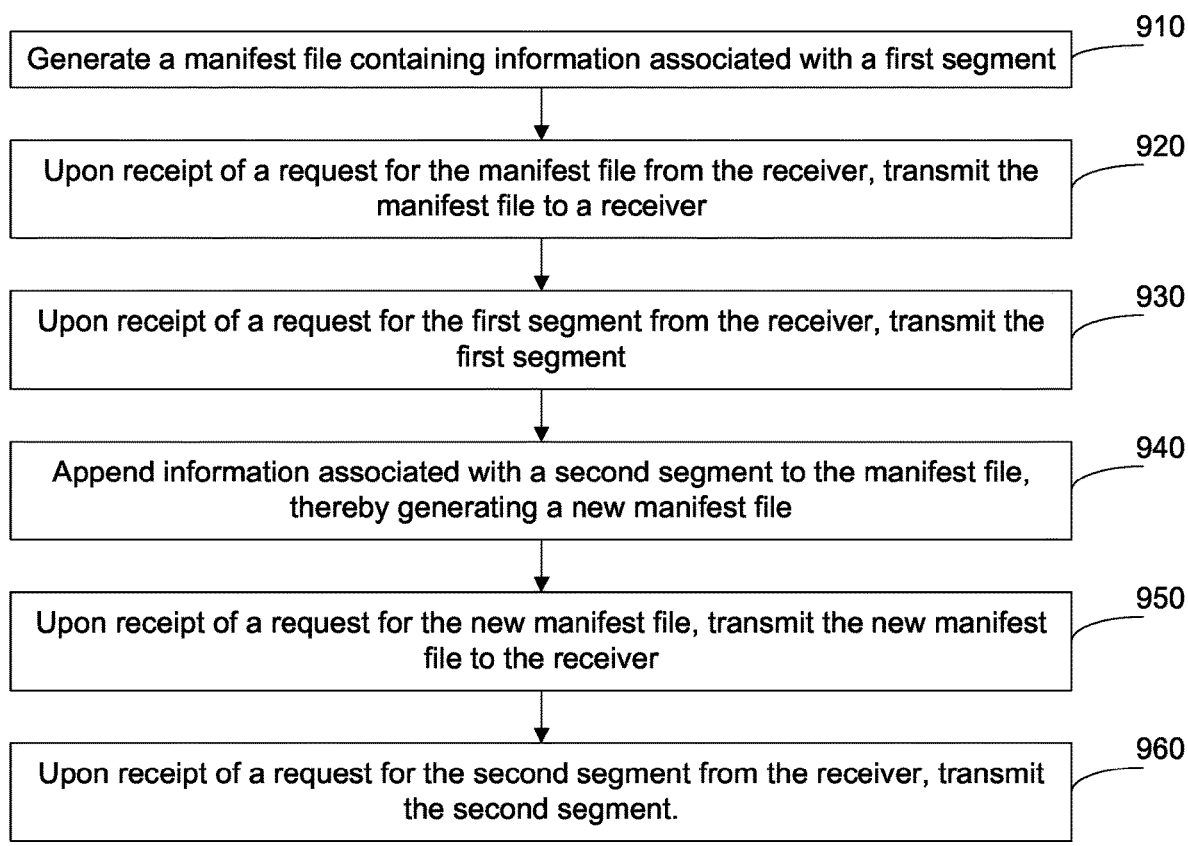
FIG. 9 illustrates an exemplary method for transmitting segments, consistent with embodiments of the present disclosure.

FIG. 9 illustrates an exemplary method 900 for transmitting segments, consistent with embodiments of the present disclosure. The example method 900 may be implemented with at least one processor (e.g., the at least one processor of the computing device in FIG. 1 or processor(s) 230 in FIG. 2). It will be appreciated that method 900 is a non-limiting example. As shown in FIG. 9, at step 910 the at least one processor may generate a manifest file containing information associated with a first segment. At step 920, the at least one processor may upon receipt of a request for the manifest file from the receiver, transmit the manifest file to a receiver. At step 930, the at least one processor may upon receipt of a request for the first segment from the receiver, transmit the first segment. At step 940, the at least one processor may append information associated with a second segment to the manifest file, thereby generating a new manifest file. At step 950, the at least one processor may upon receipt of a request for the new manifest file, transmit the new manifest file to the receiver. At step 960, the at least one processor may upon receipt of a request for the second segment from the receiver, transmit the second segment. In this manner, the at least one processor may make available segments to a receiver through the use of manifest files. It is to be understood, however, that other methods of transmitting segments may be implemented without departing from the scope and spirit of the present disclosure.

The diagrams and components in the figures described above illustrate the architecture, functionality, and operation of possible implementations of systems, methods, and computer hardware or software products according to various example embodiments of the present disclosure. For example, each block in a flowchart or diagram may represent a module, segment, or portion of code, which includes one or more executable instructions for implementing the specified logical functions. It should also be understood that in some alternative implementations, functions indicated in a block may occur out of order noted in the figures. By way of example, two blocks or steps shown in succession may be executed or implemented substantially concurrently, or two blocks or steps may sometimes be executed in reverse order, depending upon the functionality involved. Furthermore, some blocks or steps may be omitted. It should also be understood that each block or step of the diagrams, and combination of the blocks or steps, may be implemented by special purpose hardware-based systems that perform the specified functions or acts, or by combinations of special purpose hardware and computer instructions. Computer program products (e.g., software or program instructions) may also be implemented based on the described embodiments and illustrated examples.

It should be appreciated that the above-described systems and methods may be varied in many ways and that different features may be combined in different ways. In particular, not all the features shown above in a particular embodiment or implementation are necessary in every embodiment or implementation. Further combinations of the above features and implementations are also considered to be within the scope of the herein disclosed embodiments or implementations.

While certain embodiments and features of implementations have been described and illustrated herein, modifications, substitutions, changes and equivalents will be apparent to those skilled in the art. It is, therefore, to be understood that the appended claims are intended to cover all such modifications and changes that fall within the scope of the disclosed embodiments and features of the illustrated implementations. It should also be understood that the herein described embodiments have been presented by way of example only, not limitation, and various changes in form and details may be made. Any portion of the systems and/or methods described herein may be implemented in any combination, except mutually exclusive combinations. By way of example, the implementations described herein can include various combinations and/or sub-combinations of the functions, components and/or features of the different embodiments described.

Moreover, while illustrative embodiments have been described herein, the scope of the present disclosure includes any and all embodiments having equivalent elements, modifications, omissions, combinations (e.g., of aspects across various embodiments), adaptations or alterations based on the embodiments disclosed herein. Further, elements in the claims are to be interpreted broadly based on the language employed in the claims and not limited to examples described herein or during the prosecution of the present application. Instead, these examples are to be construed as non-exclusive. It is intended, therefore, that the specification and examples herein be considered as exemplary only, with a true scope and spirit being indicated by the following claims and their full scope of equivalents.

What is claimed is:

1. A non-transitory computer readable medium including instructions that, when executed by at least one processor, cause the at least one processor to perform operations for transporting data over content delivery networks, the operations comprising:
   segmenting a data stream into a plurality of segments, wherein each of the plurality of segments comprises at least one data packet containing content data of the data stream;
   generating a manifest file containing information associated with one or more segments in the plurality of segments, the manifest file including information indicating a timing sequence of a plurality of consecutive segments of the plurality of segments;
   receiving a request for the manifest file;
   authenticating the request;
   determining a release time for the at least one data packet based on at least one of a timestamp, time offset, or latency;
   transmitting the manifest file to a receiver through a content delivery network;
   receiving a request for one of the segments of the segmented data stream identified in the manifest file;
   transmitting the requested segment to the receiver through the content delivery network;
   determining that a portion of the requested segment was not received, and sending a new request for the requested segment, wherein the new request is time-limited to a byte range based on the portion of the requested segment that was not received;
   re-transmitting at least a portion of the new request through another content delivery network; and
   discarding the requested segment when a determined time has passed based on a comparison of a computed release time and a reference time.

2. The non-transitory computer readable medium of claim 1, wherein at least some of the segments in the plurality of segments have a fixed duration or a variable duration.

3. The non-transitory computer readable medium of claim 1, wherein the operations further comprise segmenting at least some of the segments in the plurality of segments into a plurality of chunks, wherein a chunk in the plurality of chunks is associated with at least one packet.

4. The non-transitory computer readable medium of claim 3, wherein the operations further comprise:
   generating a first chunk of a new segment;
   appending information associated with the new segment to the manifest file;
   transmitting the manifest file to the receiver; and
   upon receipt of a request for the new segment from the receiver, transmitting the first chunk to the receiver.

5. The non-transitory computer readable medium of claim 4, wherein the operations further comprise:
   generating a second chunk of the new segment; and
   transmitting the second chunk to the receiver following transmission of the first chunk.

6. The non-transitory computer readable medium of claim 3, wherein each chunk in the plurality of chunks has a fixed duration or a variable duration.

7. The non-transitory computer readable medium of claim 1, wherein generating the manifest file includes generating the manifest file containing information associated with a first one of the plurality of segments, the first segment information including a first segment duration and first segment timing information;

the operations further comprising:
upon receipt of a request for the first segment from the receiver, transmitting the first segment;
appending information associated with a second one of the plurality of segments to the manifest file, thereby generating a new manifest file, the appended information including a second segment duration and second segment timing information;
upon receipt of a request for the new manifest file, transmitting the new manifest file to the receiver; and
upon receipt of a request for the second segment from the receiver, transmitting the second segment.

8. The non-transitory computer readable medium of claim 1, wherein the operations further comprise encrypting at least a portion of the requested segment prior to transmitting the requested segment through the content delivery network.

9. The non-transitory computer readable medium of claim 8, wherein the encrypting comprises encrypting at least a portion of a payload of a packet associated with the requested segment.

10. The non-transitory computer readable medium of claim 1, wherein the operations further comprise:
associating a segment timestamp with the requested segment; and
associating a packet time offset with a packet of the requested segment.

11. The non-transitory computer readable medium of claim 10, wherein the operations further comprise calculating a release time for the packet using the segment timestamp and the packet time offset.

12. The non-transitory computer readable medium of claim 11, wherein the release time is calculated by adding, to the segment timestamp, a latency and the packet time offset.

13. The non-transitory computer readable medium of claim 11, wherein the operations further comprise discarding the packet when the release time has passed.

14. The non-transitory computer readable medium of claim 1, wherein the operations further comprise appending a format header to at least some of the segments in the plurality of segments.

15. The non-transitory computer readable medium of claim 1, wherein the operations further comprise:
receiving a request to re-transmit at least a portion of the requested segment when the receiver fails to receive the at least a portion of the requested segment; and
re-transmitting the at least a portion of the requested segment to the receiver through the content delivery network.

16. The non-transitory computer readable medium of claim 15, wherein the request to re-transmit at least a portion of the requested segment indicates a last packet received by the receiver, and packets subsequent to the last received packet are re-transmitted to the receiver through the content delivery network.

17. The non-transitory computer readable medium of claim 15, wherein the requested segment is re-transmitted to the receiver through another content delivery network.

18. The non-transitory computer readable medium of claim 17, wherein the operations further comprise selecting the another content delivery network from a plurality of content delivery networks based on a predetermined criteria.

19. The non-transitory computer readable medium of claim 17, wherein the operations further comprise attempting transmission of a subsequent segment using the content delivery network following re-transmission of the requested segment through the another content delivery network.

20. A computer-implemented method for transporting data over content delivery networks, the method comprising:
segmenting a data stream into a plurality of segments, wherein each of the plurality of segments comprises at least one data packet containing content data of the data stream;
generating a manifest file containing information associated with one or more segments in the plurality of segments;
receiving a request for the manifest file;
authenticating the request;
determining a release time for the at least one data packet based on at least one of a timestamp, time offset, or latency;
transmitting the manifest file to a receiver through a content delivery network;
receiving a request for one of the segments of the segmented data stream identified in the manifest file;
transmitting the requested segment to the receiver through the content delivery network;
determining that a portion of the requested segment was not received, and sending a new request for the requested segment, wherein the new request is time-limited to a byte range based on the portion of the requested segment that was not received;
re-transmitting at least a portion of the new request through another content delivery network; and
discarding the requested segment when a determined time has passed based on a comparison of a computed release time and a reference time.

21. The non-transitory computer readable medium of claim 20, wherein the operations further comprise:
determining a last portion of the content data was received;
initiating a download for the requested segment;
determining that a portion of the requested segment was not received; and
terminating download of the requested segment.

* * * * *